Patented July 6, 1954

2,683,134

UNITED STATES PATENT OFFICE 2,683,134

PRODUCTION OF ETHYLENEPOLYAMINE-MODIFIED UREA-FORMALDEHYDE RESINS

John B. Davidson and Edward J. Romatowski, Toledo, Ohio, assignors, by mesne assignments, to Allied Chemical & Dye Corporation, New York, N. Y., a corporation of New York No Drawing. Application December 17, 1951, Serial No. 262,192

9 Claims. (Cl. 260—70)

The invention relates to the production of a thermosetting resin capable of imparting superior wet strength to paper.

When used for imparting wet strength to paper, a synthetic resin is usually incorporated at the wet end of the paper making process, for example, in the beater or at the head box. A synthetic resin that is incorporated at the wet end of the paper making process must be capable of dilution without precipitation of the resin, and must have an affinity for the paper fibers so that a reasonably large proportion of the resin deposits on the paper fibers and so that an unreasonably large proportion of the resin is not lost in the waste water.

The principal object of the invention is the production of a urea-formaldehyde resin that imparts superior wet strength to paper. More specific objects and advantages are apparent from the description, which illustrates and discloses but is not intended to limit the invention.

United States Patent No. 2,554,475 discloses a method of preparing a reaction product of urea, formaldehyde and a salt of an ethylenepolyamine such as ethylenediamine or diethylenetriamine. In the method disclosed by that patent, the reaction is carried out at a pH below 4. The patent discloses that if the pH at the beginning of the reaction is near 4, it drops rapidly to a value of 2 or below.

The problem with which the present invention is concerned is a problem of pH control. This problem of pH control is created by the presence of the ethylenepolyamine salt in the reaction mixture. Because of the presence of the ethylenepolyamine salt, the pH of the reaction mixture has a tendency to drop sharply.

For example, if urea, an ethylenepolyamine salt and an aqueous solution of formaldehyde are mixed to form a solution having a pH of 6.6 and the solution is heated, the pH of the solution drops precipitately to about 3 or below as soon as the temperature of the solution begins to rise. It has now been found that the wet strength imparted to paper by the resinous reaction product can be greatly enhanced by preventing such drop in pH in accordance with the present method. The present method produces a resin that imparts greater wet strength to paper per dollar's worth of resin than any resin heretofore known.

In the method disclosed by U. S. Patent No. 2,554,475, the pH is allowed to drop to a value of 2 or below while the reaction mixture is held at a temperature between 68 degrees C. and the boiling point. The patent discloses that the viscosity of the reaction mixture remains constant at this temperature; that when the temperature of the reaction mixture is lowered slightly, the viscosity begins to increase; and that when the viscosity has thus increased to the desired value, the reaction can be arrested by neutralizing.

Thus, in the method disclosed by that patent, the pH of the reaction mixture is allowed to fall to 2 or below, and the reaction mixture is then cooled to about 55 degrees C. to cause the condensation to proceed to the desired viscosity. If the reaction mixture were kept neutral or alkaline, the desired condensation would not take place.

In contrast, the present method comprises bringing together a urea-formaldehyde reaction product of less than the desired viscosity and a salt of an ethylenepolyamine having not more than four ethylene groups in aqueous solution at a pH above 4, and then carrying out condensation by maintaining the solution at a pH between 4 and 6 and at a temperature from 70 degrees C. to the boiling point until the desired viscosity is attained. In the present method, the pH is kept between 4 and 6 during the condensation reaction. Preferably the reaction is carried out at a pH from about 4.2 to about 5.6 because the reaction is too slow at a pH much above 5.6.

The present invention is based upon the discovery that there is a relatively narrow pH range slightly above 4 in which the reaction can be carried out to obtain much better results than are obtained by carrying out the reaction in the pH range disclosed by United States Patent No. 2,554,475. In this relatively narrow pH range the reaction pursues a course quite different from the course which it pursues when it is carried out at a pH below 4 as disclosed by such patent. In the pH range below 4, the reaction is retarded by raising the temperature and is accelerated by lowering the temperature, and the pH has a tendency to drop rapidly. In the narrow pH range of the present method, on the other hand, the reaction is accelerated by raising the temperature and is retarded by lowering the temperature, and the pH has a tendency to rise.

Although in the present method the reaction is carried out in a relatively narrow pH range, the present method is much safer than the method disclosed in U. S. Patent No. 2,554,475, because at the low pH used in the method of the patent there is an imminent danger that the reaction mixture will gel to a worthless, insoluble mass. Moreover, a reaction at such a low pH must be carried out in glass-lined equipment because of the corrosive character of the reaction mixture.

The superior wet strength that is obtained by preparing the resin in accordance with the present method, in which the pH is prevented from falling, as compared with the wet strength that is obtained when the pH is permitted to fall, has been demonstrated as follows:

A paper-treating resin was prepared by the method of the invention, as follows: An ethylenepolyamine (37.8 grams of tetraethylenepentamine) was added to methanol-free formalin (323 grams of a solution consisting of 50.2 per cent formaldehyde and 49.8 per cent water by weight) in a 1 liter 3-necked flask fitted with a thermometer, stirring rod, reflux condenser and oil seals. The pH of the mixture was adjusted with concentrated hydrochloric acid to 7.6. Urea (120 grams) was added and the mixture was heated to 95 degrees C. The pH, which was still above 7, was then lowered to 5.4 with formic acid. In about twenty-five minutes at 95° C. it rose to 6.4. It was then readjusted to 5.6 with formic acid and the reaction was continued at 95° C. until the viscosity of the condensation product was L–M. The condensation was then continued, without heating, to a viscosity of U–V (as measured by the Gardner-Holdt Bubble Viscometer standard method) while the temperature fell to about 75° C. The resulting resin was neutralized with 25 per cent aqueous sodium hydroxide solution to a pH of 7.1 and diluted with water to a 44.9 per cent solids concentration.

A beaten pulp suspension was prepared as follows:

Pulp (400 grams of unbleached kraft pulp containing the equivalent of 360 grams of oven-dried pulp) was soaked in water (10 liters) overnight. The soaked pulp was then agitated for 10 minutes with a "Lightnin" mixer (a high-speed motor-driven stirrer). The agitated suspension was then placed in a "Valley" beater (a standard beater designed for laboratory use) and enough water was added to bring the total volume of water to 23 liters (measured at a temperature of 25 degrees C.) The beater was run for five minutes (slush period) before a load (4500 grams) was placed on the lever arm which applied a force to the beater roll. Samples were withdrawn at various intervals during the beating to measure the rate at which water passed through the pulp (freeness) as Schopper freeness. The beating was terminated (after about one-half hour) when the freeness was 550. The beaten pulp was diluted to such an extent that a volume of approximately 800 ml. gave a dry sheet weighing 2.0 grams. A catalyst was added at this point (2 per cent alum based on the weight of dry pulp). The beaten pulp suspension was allowed to stand for five minutes and was then ready for the addition of the resin for imparting wet strength.

A resin for imparting wet strength (the resin solution prepared as described above by the method of the invention in an amount sufficient to give 2 per cent resin, based on the weight of dry pulp) was added to the beaten pulp suspension. A volume of stock large enough to give a sheet of the desired 2.0 gram weight (800 ml.) was placed in the sheet machine and diluted to a total volume of 10.7 liters, and the pH was adjusted to 4.5 by addition of sulfuric acid. The handsheet was made within five minutes after the addition of the resin, and the operation was repeated four times without delay to make four more sheets.

The handsheets of wet-strengthened paper were made according to "Institute of Paper Chemistry—Tentative Method 411–B—Valley." The sheets were pressed separately between six blotters under a pressure of 100 pounds for two minutes. Each sheet was placed on the drier while still in contact with one blotter (sheet against the metal) and dried for five minutes at 230 degrees F. The handsheets were conditioned for a minimum of eight hours at a temperature of 73 degrees F., and at 50 per cent relative humidity.

Wet tensile strength measurements in kilograms per ½ inch of paper strip, tested after soaking for one hour in water at 23 degrees C., were made on the handsheets with a standard pendulum-type tensile tester. The paper treated with the resin of the invention had a basis weight of 40 pounds ("basis weight" is the weight of 500 sheets of the paper, 25 inches by 40 inches).

For the sake of comparison, wet tensile strength results were also obtained using a control resin (in the preparation of which the pH was permitted to fall) to treat the beaten pulp suspension as hereinbefore described. The control resin was prepared by the following procedure:

An ethylenepolyamine (37.8 grams of tetraethylenepentamine) was added to formalin (318 grams of a solution consisting of 51 per cent formaldehyde and 49 per cent water by weight) in a 1 liter 3-necked flask fitted with a thermometer, stirring rod, reflux condenser and oil seals. The pH of the mixture was adjusted to slightly below 6.6 with concentrated hydrochloric acid. Urea (120 grams) was added and the mixture was heated to 95 degrees C. During the heating the pH dropped to less than 3.8. The pH then was raised to 6.6 with 25 per cent aqueous sodium hydroxide, but during one hour at 95° C. it dropped to 5.7. Formic acid was added to adjust the pH to 5.4. The pH rose to 5.8 while the condensation was continued at 95 degrees C. to a viscosity of L–M. The condensation was then continued, without heating, to a viscosity of V, while the temperature fell to about 75° C. The resulting resin was neutralized with 25 per cent aqueous sodium hydroxide to a pH of 7.2 and diluted with water to a 46.8 per cent solids concentration. In the foregoing procedure the urea-formaldehyde reaction product and the ethylenepolyamine salt were not brought together in aqueous solution at a pH above 4, because the reaction product of urea and formaldehyde was actually formed at a pH below 4 in the presence of the salt.

The wet tensile strength of sheets prepared from the beaten pulp suspension treated with the control resin described in the preceding paragraph is less than 89 per cent as great as that of the sheets prepared from the beaten pulp suspension treated with the former resin, prepared by the method of the invention in which the pH is prevented from falling.

A synthetic resin for imparting wet strength to paper is desirably incorporated at the wet end of the paper making process before the paper is made, since this more convenient and less expensive method of applying the resin to the paper results in a wet-strengthened paper which is not coated with a sealing. This is known as "wet and addition," the term referring not only to addition in the beater but also to addition in the machine chest, head box, fan pump or any other desired point at the wet end of the paper making process. Since in the production of paper the mixture at the point of resin addition ordinarily comprises a very dilute suspension of pulp in water (less than two per cent) and a synthetic resin used for imparting wet strength is usually present in this suspension in a concentration of about one to two per cent of the pulp concentration, such a resin must be capable of dilution without precipitation. Such a resin should be a thermosetting composition so that it can be added in its water-soluble state to disperse and dissolve throughout the paper pulp suspension at the wet end of the paper making process before the paper is made, and then can be converted to a thermoset resin on the paper fibers by heating during drying or aging during storage.

The solubility in water of a urea-formaldehyde resin for use in "wet and addition" is usually represented by a typical parabolic solubility curve, plotted by determining the cloud temperature at various concentrations of resin and water. ("Cloud temperature" is that temperature above which a one phase water solution exists at a given concentration of resin.) The parabolic solubility curve of a resin for use in beater sizing must not represent too large a range of insolubility (cloud formation) at ordinary temperatures. As the resin in concentrated solution or in dry form is added to the pulp suspension in the wet end of the paper making process, it may form clouds at the point of addition. It is necessary that the resin reach a concentration at which it is soluble rapidly enough so that the clouds which form at the point of addition of the resin dissolve and disperse before they have time to become curds, for curds adhere to the equipment and usually do not re-dissolve and disperse in the pulp suspension so as to permit the paper fibers to be uniformly coated. If the resin is sufficiently soluble that it is capable of forming a 0.1 per cent aqueous solution at ordinary temperatures (that is, at the practical operating temperatures ordinarily used during beater sizing, approximately 10 to 25 degrees C., varying, of course, with the location of the paper mill) the resin will pass through the concentration at which clouds form too rapidly for the clouds to become curds, and such a resin may be safely used for "wet and addition."

Ordinary urea-formaldehye resins are far too insoluble when incorporated in the beater under the slightly acid conditions used and form curds before they have had time to be dispersed and dissolved in the water. It is necessary, therefore, to incorporate a modifying agent in a urea-formaldehye resin which will make such a resin sufficiently soluble so that it will not form curds at ordinary temperatures as it is added to the pulp suspension in the wet end of the paper making process. In the practice of the present invention the modifying agent with which urea and formaldehye are reacted is a salt of an ethylenepolyamine having not more than four ethylene groups. Such a modifying agent is so effective as a solubilizer that it can be used in relatively small amounts as compared with the modifying agents heretofore used in urea-formaldehyde wet strength resins.

Ethylenepolyamine salt

An ethylenepolyamine having not more than four ethylene groups whose salt is used in the present method of producing a paper-treating resin is a substance having the general formula $$NH_2(-CH_2-CH_2-NH-)_nH$$

wherein $n$ is an integer from 1 to 4. Thus, the ethylenepolyamine may be ethylenediamine, diethylenetriamine, triethylenetetramine, or tetraethylenepentamine.

The ethylenepolyamine salt may be any water soluble salt of an acid that does not interfere in the reaction. It is most desirable that it be a salt of a strong inorganic acid such as hydrochloric acid, sulfuric acid or phosphoric acid, although it may be a salt of any carboxylic acid having not more than two carbon atoms (e. g., formic acid or acetic acid), or any hydroxy-substituted carboxylic acid having not more than four carbon atoms per carboxy group. This latter acid may be any substance whose molecule consists of a substituted straight or branched hydrocarbon chain having at least one carboxy group and at least one hydroxy group each attached to a primary, secondary, or tertiary carbon atom, and having no substituents other than carboxy and hydroxy groups, said molecule having not more than four carbon atoms per carboxy group (i. e., not more than three additional carbon atoms per carboxy group) and having not more than a total of eight carbon atoms. Such substances include glycolic acid, lactic acid, hydroxyglutaric acid, hydroxybutyric acid, malic acid and tartaric acid.

Urea-formaldehyde reaction product

The term "urea-formaldehyde reaction product of less than the desired viscosity" is used herein to mean that the urea-formaldehyde reaction product that is brought together with an ethylenepolyamine salt in aqueous solution at a pH above 4 in the practice of the invention is an intermediate reaction product. That is, the urea-formaldehyde reaction product is an intermediate product that is capable of further condensation with the ethylenepolyamine salt to produce a final condensation product of the desired viscosity.

Such an intermediate urea-formaldehyde reaction product (i. e., a methylol urea) may be prepared by reacting urea and formaldehyde in the proportions hereinafter described. In general, the reaction of formaldehyde with urea may be conducted by mixing aqueous formaldehyde with urea at normal temperatures, but heating ordinarily is desirable to shorten the time of reaction. Although the reaction may be carried out at about 30 degrees C. for about six hours to form dimethylol urea, ordinarily it is preferable to react for about one hour at 60 to 70 degrees C. Usually the pH during the formation of such an intermediate urea-formaldehyde reaction product should be at least 7 and may be as high as 8 or 9, and a basic catalyst such as sodium hydroxide or triethanolamine may be used during this step.

The formaldehyde employed in the practice of the invention may be in the form of one of its polymers such as paraformaldehyde or may be used in any combination with one of its polymers. Usually the aqueous reaction medium used in the practice of the invention consists of the water present in an aqueous formaldehyde solution. Although the formaldehyde used may be ordinary commercial formalin (i. e., a aqueous solution comprising approximately 37 per cent formaldehyde by weight), it is preferable to use an aqueous formaldehyde solution having a concentration of about 45 to 50 per cent. Further dilution during the reaction is undesirable since it results in resins having decreased stability and lower solubility. Reacting at a higher solids concentration than is achieved using ordinary commercial formalin results in resins which impart greater wet strength. The stability of resins reacted at higher solids concentrations (i. e., resins made from a formaldehyde solution having a concentration of 45 to 50 per cent) can be increased by dilution of the resin after preparation.

*Production of thermosetting resin*

In the production of a paper-treating resin of the invention in accordance with the present method, an intermediate urea-formaldehyde reaction product, as hereinbefore described, is brought together with a salt of an ethylenepolyamine (as hereinbefore described) in aqueous solution at a pH above 4, and condensation of these substances to the desired viscosity then is carried out by maintaining the solution at a pH between 4 and 6 and at a temperature from 70 degrees C. to the boiling point.

The minimum proportion of ethylenepolyamine salt in a resin of the invention is that which produces a resin having the required solubility to impart improved wet strength to paper. As much ethylenepolyamine salt over this minimum amount may be used as seems economically feasible for obtaining a resin with the properties desired. For a given weight of resin the wet strength increases with increasing amounts of the ethylenepolyamine salt until a maximum is reached, after which the wet strength starts to decrease. When an extremely soluble resin is desired, the amount of ethylenepolyamine salt may be increased over that amount which gives maximum wet strength per unit of weight of resin. To obtain satisfactory wet strength with such a soluble resin it may be necessary to increase the amount of the resin used. In general, the proportion of ethylenepolyamine salt may range from 0.01 to 0.2 mol per mol of urea, but it is preferable that it be from 0.05 to 0.15 mol per mol of urea, and it is most desirable that it be about 0.1 mol per mol of urea.

The preferred proportion of formaldehyde in the practice of the invention depends upon the particular ethylenepolyamine used. In general, it is preferable to use about 2 mols of formaldehyde for each mol of urea and to use an additional mol of formaldehyde for each mol of reactive hydrogen on the amine groups in the ethylenepolyamine, for reasons hereinafter explained. The use of formaldehyde in excess of these amounts makes for a resin having greater storage stability. However, such a resin does not impart as high wet strength, and thus an excess of formaldehyde over a total of about 3.0 mols per mol of urea is undesirable. On the other hand, although the use of less than the above amounts of formaldehyde gives a more reactive resin that imparts higher wet strength, the resin may not have the storage stability required of most wet strength resins (i. e., at least 90 days storage stability at ordinary temperatures), and it is desirable to use not less than a total of about 1.9 mols of formaldehyde per mol of urea.

Although the reaction pH may be as low as 4.1 or as high as 5.9, it is preferable that it be from about 5.0 to about 5.6 during the condensation, which is conducted at a temperature from 70 degrees C. to the boiling point, as hereinafter further discussed.

As hereinbefore stated, in the practice of the invention there should be a sufficient amount of formaldehyde to react with the reactive hydrogen atoms on the amine groups in the ethylenepolyamine salt. It is believed that the ethylenepolyamine salt used in the practice of the present invention, when dissolved in the aqueous reaction medium (derived from an aqueous formaldehyde solution), forms an ethylenepolyammonium salt, and that one molecule of formaldehyde in the aqueous reaction medium combines with one molecule of water to form methylene glycol. The methylene glycol molecule condenses with a hydrogen atom attached to a nitrogen atom in the polyammonium salt molecule (for example, an ethylenediammonium chloride molecule) and with an NH₂ group in the urea molecule as follows:

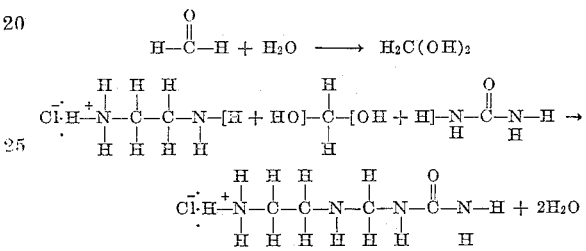

The remaining hydrogen atoms attached to nitrogen atoms in the product condense with additional formaldehyde (and urea) so long as there is a sufficient amount of formaldehyde to react with these groups. Thus, complex resin molecules are formed. It is believed that the ethylenepolyamine salt which thus becomes part of the urea-formaldehyde molecule through the hydrogen atoms in the amine groups contributes to the water solubility, and that the polyammonium ions which impart a positive charge to the resin molecule in solution also contribute to the water solubility of the resin. It is believed that the excellent wet-strengthening properties of resins of the invention are due to greater retention of resins containing such positively charged ethylenepolyammonium ions (which are cationic resins) on the cellulose fibers (which are reported to be negatively charged).

If desired, the ethylenepolyamine itself may be added to a neutral or slightly alkaline urea-formaldehyde intermediate reaction product. Then, the ethylenepolyamine salt may be formed in situ by addition of one of the acids hereinbefore described. When the ethylenepolyamine salt is a salt of a strong acid such as hydrochloric acid, it is preferable to add only the amount of acid required to form the salt. Then, the pH of the solution of the urea-formaldehyde reaction product and the ethylenepolyamine salt may be adjusted to within the range between 4 and 6 by the addition of a dilute weak acid such as formic acid. The use of a weak acid to adjust the pH to within the range required for the condensation in the practice of the invention is desirable in order to obtain better control of the pH, i. e., to avoid gelling at the point of addition of the acid. Of course, if the ethylenepolyamine salt used is a salt of a weak acid such as formic acid and if it is formed in situ, sufficient acid can be added all at once to adjust the pH to between 4 and 6. However, it is preferable that the ethylenepolyamine salt be a salt of a strong acid. Alternatively, the pH of the urea-formaldehyde reaction product may be adjusted first to within the range between 4 and 6 if the ethylenepolyamine salt that is added does not reduce the pH below 4. Of course, when this procedure is used, it is necessary to add the ethylenepolyamine salt immediately after reducing the pH of the urea-formaldehyde reaction product, since such reaction product may be unstable in this pH range. Still another procedure consists in adding, to an aqueous solution of the ethylenepolyamine salt, the urea-formaldehyde reaction product along with an agent to adjust the pH to within the range between 4 and 6 required for the condensation. Thus, any convenient procedure may be employed for bringing together the ethylenepolyamine salt and the urea-formaldehyde reaction product at a pH above 4.

If it is desired to simply mix the urea, aqueous formaldehyde and ethylenepolyamine salt (or the ethylenepolyamine itself along with sufficient acid to form the salt in situ), it is desirable, in order to keep the pH under control, to maintain the pH of such a mixture above 6.6 until the mixture is heated to a temperature of 90 degrees C. and only then to reduce the pH between 4 and 6, i. e., the pH should not be reduced to this range until the urea and formaldehyde have reacted to form an intermediate product. If such a mixture is heated at a pH below 6.6, the pH drops rapidly to below 4, and the resulting resin yields poor wet strength (as hereinbefore demonstrated). However, if a mixture of the urea, formalin and ethylenepolyamine salt is maintained at a pH not lower than 6.6 until the mixture is heated to about 90 degrees C., the pH then can be lowered to within the proper range for condensation, and the reaction then can be carried out at any temperature between 70 degrees C. and the boiling point. For example, an ethylenepolyamine may be added to formalin (in the proportions hereinbefore described) at a temperature between 20 and 50 degrees C. (Formalin is too obnoxious to an operator at temperatures higher than 50 degrees C.) A sufficient amount of acid is added to form a salt (as hereinbefore described) with the ethylenepolyamine before adding the urea and heating to 90 degrees C. or above, preferably about 95 degrees C. The pH of this mixture should not be below 6.6 and preferably is not below 7.0 during this heating stage. Although the pH may be as high as 9.0, it is preferable that it be not higher than about 8.0. It is desirable that the mixture be heated to 90 degrees C. or above in about 15 to 30 minutes, so that the solution will remain clear. As soon as the temperature is above 90 degrees C. the pH may be lowered with a dilute weak acid to within the range between 4 and 6. From this point on the reaction can be carried out in substantially the same manner as if a urea-formaldehyde intermediate reaction product were initially brought together with the ethylenepolyamine salt in aqueous solution at a pH between 4 and 6.

When the intermediate urea-formaldehyde reaction product is prepared separately and then is brought together with a salt of an ethylenepolyamine at a pH above 6, the pH is adjusted to between 4 and 6 and the solution is maintained at a pH between 4 and 6 during the subsequent condensation. It is preferable, however, that the pH be adjusted initially with a dilute weak acid to within the range between 4.0 and 4.8, and it is most desirable that the initial pH be between 4.2 and 4.6. Then, ordinarily, as the heating is continued the pH rises and approaches 6 during the subsequent condensation. Preferably the pH rises to about 5.2 to 5.6, and the condensation is completed in this pH range. Although the reaction temperature in carrying out the condensation may be from 70 degrees C. to the boiling point, it is preferable that it be from about 80 to about 98 degrees C. and most desirable that it be from about 90 to about 98 degrees C. in order to obtain a controllable reaction that is completed within a reasonable time. (These temperatures apply, of course, when the reaction is conducted at ordinary atmospheric pressures, which is usually the most economical procedure. However, superatmospheric pressures may be used with correspondingly higher temperatures.) In general, when the reaction is conducted at a final pH of 5.2 to 5.6 and at a temperature of about 95 degrees C. the reaction time may be from three to six hours, whereas at a pH of 6.0 and at the same temperature the reaction time may be from 18 to 24 hours.

In general resins of higher viscosity impart better wet-strength to paper. However, the increase in wet strength may be inappreciable beyond a certain viscosity, and since increased condensation tends to decrease both the stability and the water solubility of the resin, the reaction should be terminated when that viscosity has been reached. The viscosity of resins reacted to the same degree of condensation will, of course, differ in accordance with the solids concentration of the reaction mixture. Resins embodying the present invention in which the proportion of formaldehyde to urea is within the limits hereinbefore given, and in which the concentration of the aqueous solution of formaldehyde used is about 45 per cent, are reacted to a desirable degree of condensation by reacting at 95 degrees C. until the viscosity of the solution is L–M (measured by the Gardner-Holdt Bubble Viscosimeter standard method), cooling the solution to a temperature of about 75 degrees C. and then continuing the reaction at that temperature until the viscosity of the resin solution is U–V.

Using a two-stage reaction (that is, reacting first at 95 degrees C. to a certain viscosity and then reaching the final viscosity by reacting at 75 degrees C.) ordinarily makes the reaction more controllable and gives more reproducible results than a one-stage reaction carried to the same final viscosity at 95 degrees C., although there is no essential difference in the properties of the final product.

The wet-strengthening properties of a resin embodying the invention are increased when the resin is aged at room temperature or even lower temperatures for as long a period of time as the resin remains stable. It is desirable to neutralize the liquid resin with a base such as sodium hydroxide to a pH of 7.0 to 8.0 and most desirable to adjust the pH to the range 7.2 to 7.4, for greater stability of the resin. The stability of resins of the invention may be further improved by diluting to a concentration of about 40 per cent solids.

The following examples illustrate the practice of the invention:

*Example 1*

A paper-treating resin is prepared by the method of the invention, as follows: An ethylenepolyamine (20.6 grams of diethylenetriamine) is added to methanol-free formalin (295 grams of a solution consisting of 51 per cent formaldehyde and 49 per cent water by weight) in a 1 liter 3- necked flask fitted with a thermometer, stirring rod, reflux condenser and oil seals. The pH of the mixture is adjusted with concentrated hydrochloric acid to slightly above 7.8. Urea (120 grams) is then added, and the pH is adjusted with 25 per cent aqueous sodium hydroxide to slightly above 7.0. The mixture is then heated to 95 degrees C. within 20 minutes. As soon as the temperature reaches 95 degrees C. the pH is adjusted to 4.2 with 90 per cent formic acid. In five minutes at 95° C. the pH rises to 6.2. It is again lowered with formic acid to 4.0 and in twenty minutes rises to 5.2. The mixture is then condensed at this pH and at 95° C. to a viscosity of L–M (Gardner-Holdt). The condensation is then continued, without heating, to a viscosity of V while the temperature falls to 75° C. The resulting resin is neutralized with 25 per cent aqueous sodium hydroxide to a pH of 7.2 and is diluted with water to a 43.3 per cent solids concentration.

The wet tensile strength of sheets prepared from a beaten pulp suspension treated with this resin by the procedure hereinbefore described is 2.6 kilograms per ½ inch paper strip. This is about 15 per cent greater than the wet tensile strength imparted by the best modified urea-formaldehyde wet strength resin heretofore known.

Example 2

An ethylenepolyamine (29.2 grams of triethylenetetramine) is added to methanol-free formalin (306 grams of a solution consisting of 51 per cent formaldehyde and 49 per cent water by weight) in the apparatus described in Example 1. The pH of the mixture is adjusted with concentrated hydrochloric acid to 7.5 before adding urea (120 grams) and heating the mixture to 95 degrees C. As soon as the temperature of the mixture is 95 degrees C., the pH is adjusted to 4.8 with formic acid, but rises to 5.4. Upon lowering it to 5.0 with additional formic acid it soon rises to 5.6. The condensation is then carried out at this pH and at 95° C. to a viscosity of L–M (Gardner-Holdt). The condensation is then continued, without heating, to a viscosity of V while the temperature falls to about 75° C. The resulting resin is neutralized to a pH of 7.2 and is diluted with water to a viscosity of K. The wet strength imparted by this resin is approximately 97 per cent of the wet strength imparted by the resin of the invention prepared as described in Example 1.

Example 3

An ethylenepolyamine (15.6 grams of an aqueous solution comprising 77 per cent by weight of ethylenediamine) is added to methanol-free formalin (282 grams of a solution consisting of 51 per cent formaldehyde and 49 per cent water by weight) in the apparatus described in Example 1. The pH of the mixture is adjusted to 7.0 with concentrated hydrochloric acid before adding urea (120 grams) and heating the mixture to 95 degrees C. As soon as the temperature reaches 95 degrees C. the pH is adjusted to 5.5 with formic acid. The condensation is then continued at this pH and at 95° C. until the viscosity is I–J. The resin is then cooled to 70 degrees C. and the condensation is continued at 70° C. until the viscosity is V. The resulting resin is neutralized with 25 per cent aqueous sodium hydroxide to a pH of 7.1 and is diluted to a 45.1 per cent solids concentration.

Having described the invention, we claim:

1. A method of producing a thermosetting resin capable of imparting superior wet strength to paper that comprises bringing together a urea-formaldehyde reaction product of less than the desired viscosity, wherein the molar ratio of urea to formaldehyde is from 1:1.9 to 1:3.0, and from 0.01 to 0.2 mol per mol of urea of a water-soluble salt of an ethylenepolyamine having not more than four ethylene groups in aqueous solution at a pH above 4, and then carrying out condensation by maintaining the solution at a pH above 4 and below 6 and heating at a temperature from 70 degrees C. to the boiling point to effect viscosity increase.

2. A method as claimed in claim 1 wherein the urea-formaldehyde reaction product and the salt are brought together in aqueous solution at a pH above 6, and the pH is then brought above 4 and below 6 to carry out the condensation.

3. A method as claimed in claim 1 wherein the condensation is carried out at a pH from 4.2 to 5.6.

4. A thermosetting resin capable of imparting superior wet strength to paper, produced by the method of claim 1.

5. A method as claimed in claim 1 wherein the urea-formaldehyde reaction product is formed, in the presence of the salt, in aqueous solution at a pH above 4.

6. A method as claimed in claim 1 wherein the salt is a salt of ethylene diamine.

7. A method as claimed in claim 1 wherein the salt is a salt of diethylene triamine.

8. A method as claimed in claim 1 wherein the salt is a salt of triethylene tetramine.

9. A method as claimed in claim 1 wherein the salt is a salt of tetraethylene pentamine.

References Cited in the file of this patent

UNITED STATES PATENTS

| Number | Name | Date |
|---|---|---|
| 2,554,475 | Suen | May 22, 1951 |
| 2,601,598 | Daniel | June 24, 1952 |

FOREIGN PATENTS

| Number | Country | Date |
|---|---|---|
| 851,404 | France | Oct. 7, 1939 |